(12) United States Patent
Chahine et al.

(10) Patent No.: US 6,200,486 B1
(45) Date of Patent: Mar. 13, 2001

(54) FLUID JET CAVITATION METHOD AND SYSTEM FOR EFFICIENT DECONTAMINATION OF LIQUIDS

(75) Inventors: Georges L. Chahine, Silver Spring; Kenneth M. Kalumuck, Columbia, both of MD (US)

(73) Assignee: Dynaflow, Inc., Fulton, MD (US)

( * ) Notice: Subject to any disclaimer, the term of this patent is extended or adjusted under 35 U.S.C. 154(b) by 0 days.

(21) Appl. No.: 09/285,864

(22) Filed: Apr. 2, 1999

(51) Int. Cl.$^7$ ............... C02F 1/00; C02F 1/02; C02F 1/32; F15D 1/02
(52) U.S. Cl. ............ 210/748; 210/749; 210/764; 210/765; 210/766; 210/774; 210/175; 210/198.1; 210/206; 210/220; 239/251; 239/399; 239/487
(58) Field of Search ................. 210/748, 749, 210/764, 765, 766, 774, 175, 198.1, 206, 220; 239/399, 487, 251

(56) References Cited

U.S. PATENT DOCUMENTS

| | | |
|---|---|---|
| 3,528,704 | 9/1970 | Johnson, Jr. . |
| 4,076,617 | 2/1978 | Bybel et al. . |
| 4,262,757 | 4/1981 | Johnson, Jr. et al. . |
| 4,389,071 | 6/1983 | Johnson, Jr. et al. . |
| 4,474,251 | 10/1984 | Johnson, Jr. . |
| 4,508,577 | 4/1985 | Conn et al. . |
| 4,610,321 | 9/1986 | Whaling . |
| 4,681,264 | 7/1987 | Johnson, Jr. . |
| 4,906,387 | 3/1990 | Pisani . |
| 4,990,260 | 2/1991 | Pisani . |
| 5,086,974 | 2/1992 | Henshaw . |
| 5,154,347 | 10/1992 | Vijay . |
| 5,198,122 | 3/1993 | Koszalka et al. . |
| 5,326,468 | 7/1994 | Cox . |
| 5,393,417 | 2/1995 | Cox . |
| 5,431,346 | * 7/1995 | Sinaisky ............... 239/399 |
| 5,494,585 | 2/1996 | Cox . |

OTHER PUBLICATIONS

Kalumuck et al., "The Use of Cavitating Jets to Oxidize Organic Compounds in Water," Proceedings of FEDSM '98, 1998 ASME Fluids Engineering Division Summer Meeting, Jun. 21–25, 1998, Washington, D.C.

* cited by examiner

Primary Examiner—David A. Reifsnyder (57) ABSTRACT

The invention is directed to a high efficiency method for the remediation of large quantities of liquids, operating at low to moderate ambient pressures, in order to reduce environmental or health risks or to purify the liquid for use in industrial processing. Decontamination is achieved through the use of submerged liquid jets which trigger cavitation events. These cavitation events drive chemical reactions, by generating strong oxidants and reductants, efficiently decomposing and destroying contaminating organic compounds, as well as some inorganics. These same cavitation events also physically disrupt or rupture the cell walls or outer membranes of microorganisms (such as *E. coli* and salmonella) and larvae (such as Zebra mussel larvae), leaving the inner cellular components susceptible to oxidation.

21 Claims, 5 Drawing Sheets

FLUID JET CAVITATION METHOD AND SYSTEM FOR EFFICIENT DECONTAMINATION OF LIQUIDS

BACKGROUND OF THE INVENTION

As the environmental, health and industrial impact of pollutants increases, it is becoming increasingly important to develop new methods for the rapid and efficient removal of a wide range of contaminants from polluted waters and other liquids. The invention is directed to a high efficiency method for the remediation of large quantities of liquid, operating at low to moderate ambient pressures, in order to reduce environmental or health risks or to purify the water for use in industrial processes. Moreover, this method reduces or eliminates the use of chemical additives. Rather, decontamination is achieved through the use of submerged liquid jets which trigger hydrodynamic cavitation events in the liquid. These cavitation events drive chemical reactions, by generating strong oxidants and reductants, efficiently decomposing and destroying contaminating organic compounds, as well as some inorganics. These same cavitation events both physically disrupt or rupture the cell walls or outer membranes of microorganisms (such as E. coli and salmonella) and larvae (such as Zebra mussel larvae), and also generate bactericidal compounds, such as peroxides, hydroxyl radicals, etc., which assist in the destruction of these organisms. Following disruption of the cell wall or outer membrane, the inner cellular components are susceptible to oxidation.

There are many means for removing contaminants and inclusions from liquids, including filtration, stripping, adsorption, absorption, and ion exchange. One technique employs oxidation of contaminants, in which chemical reactions are induced with oxidization agents to break the compounds down into simpler substances which, in turn, may also be oxidized. In the case of organic contaminants, the ultimate end products of oxidation reactions are typically nontoxic substances such as water and carbon dioxide. Thus, oxidation may completely destroy the contaminating substances, rather than merely removing them from the water for disposal elsewhere.

Oxidation reactions may be induced by a variety of means, such as the use of various chemicals, ozone, or supercritical water, or photochemical oxidation where ultraviolet radiation is used to produce hydroxyl radicals, which are strong oxidizing agents. These methods are often costly. Oxidation reactions also can be initiated by inducing hydrodynamic cavitation events in the solution, that is, by inducing the growth and rapid collapse of cavitation bubbles (also called cavities, microcavities or microbubbles) in the liquid. According to one theory, the generation of a "hot spot" (a local high temperature and pressure region) upon cavity collapse is responsible for dissociating the water molecules in aqueous liquids to produce hydroxyl radicals. Other oxidizing radicals may be formed in aqueous solutions as well as in non-aqueous environments. Oxidation reactions thus occur at the site of the collapsing cavity or bubble.

Systems using ultrasonically-induced cavitation have been found to promote a wide range of physical and chemical reactions and to be capable of at least partially oxidizing dilute aqueous mixtures of organic compounds. This may be achieved using ultrasonic horns to send a high intensity acoustic beam into the solution and excite microcavities. U.S. Pat. No. 4,076,617 (Bybel et al.) utilizes cavitation induced by acoustic means to create an emulsion of the waste material in water followed by application of ozone to oxidize the emulsified waste. U.S. Pat. No. 5,198,122 (Koszalka et al.) teaches the application of ultrasonic energy to contaminated liquids in the presence of oxidants. However, the efficiency of such ultrasonic devices is limited by achieving cavitation in the form of a cloud of cavitation bubbles only in a relatively small region near the surface of the ultrasonic source. Moreover, the efficiency of transfer of electric power into ultrasonic energy and then into the liquid itself is quite low, of the order of about 15%.

Other methods employ venturi flow to induce cavitation in contaminated aqueous solutions by relying on the pressure drop and subsequent pressure rise associated with flow through the venturi to cause cavitation bubble nuclei to grow and collapse. However, these methods are limited by their complexity and efficiency, and may require additional treatments, such as with chemical oxidizing agents, ultraviolet radiation, or both, to achieve the desired water purity. U.S. Pat. No. 4,906,387 (Pisani) and U.S. Pat. No. 4,990,260 (Pisani) teach first inducing cavitation in contaminated water which has been treated to provide hydroxyl free radicals and then irradiating the cavitated treated water with ultraviolet radiation. Cavitation is induced by passing the water through a cavitation critical flow constriction, shown in the figures to be a venturi-type constriction (that is, a cylindrical conduit of gradually decreasing and then gradually increasing inner diameter).

U.S. Pat. No. 5,326,468, U.S. Pat. No. 5,393,417, and U.S. Pat. No. 5,494,585 (the Cox patents) teach the production of oxidation by action of a cavitation venturi which is operated with a throat size and pressure drop to incur cavitation in the water. The Cox cavitation venturi comprises an inlet passage which converges in a cone, and a variable throat which is controlled by feedback from various sensors. The cavitation phenomenon which results in the formation and collapse of micro-bubbles is said to be contained in the expanding diameter outlet body of the cavitation venturi, the large end of which is essentially the same diameter as the inlet passage to the venturi. Sensors and programmable control feedback are used to adjust the throat of the venturi nozzle to optimize cavitation conditions. Oxidation is continued by the use of high energy ultraviolet radiation and/or hydrogen peroxide injection.

The cavitation taught by Cox requires high velocities and energy in order for cavitation to occur as a result of the pressure drop generated in the liquid. By contrast, the nozzles which create the fluid jets utilized in the present invention are designed to actively intensify, or energize, the cavitation generated by the pressure drop by very rapidly decreasing the inner diameter of the nozzle. This sharply changes the direction of the liquid flow, from flow along the inner periphery of the nozzle to flow toward the centerline of the nozzle and creates a first shear layer, or shear zone, inside the nozzle. This shear results in very rapid local pressure drop regions, thereby intensifying the cavitation events. In a more preferred embodiment, additional interaction with the inner surface of the nozzle can facilitate the formation of large vortical structures. Still further intensification can be obtained in certain embodiments of the invention by submerging the jet nozzles so that a large region is created in the fluid in the vicinity of the nozzle exit where strong shear and resulting low pressures are generated in a second shear layer separating the high speed liquid being ejected from the nozzle from the relatively quiescent liquid into which the jets are discharged. Fluid jet cavitation thus is considerably more aggressive than cavitation generated in a venturi-type constriction nozzle, in which the fluid flow continues to adhere to the inner wall of the conduit throughout the length of the venturi.

Submerged jet nozzles have been used to generate a highly concentrated and focused stream of cavitation in various fluids for the purpose of mechanically eroding, cutting, cleaning, or drilling into solid surfaces. See, for example, U.S. Pat. No. 4,508,577 (Conn et al.), U.S. Pat. No. 4,262,757 (Johnson et al.), U.S. Pat. No. 4,389,071 (Johnson et al.), U.S. Pat. No. 4,474,251 (Johnson et al.), U.S. Pat. No. 5,086,974 (Henshaw) and U.S. Pat. No. 4,681,264 (Johnson et al.) which describe various fluid jets and their use for cleaning, cutting, and the like.

By harnessing the more energetic cavitation induced by a jet nozzle, it has now been found that large volumes of liquid can be more aggressively decontaminated, resulting in increased purity without requiring additional oxidation steps. In a preferred embodiment, the jet nozzle is designed to rapidly raise the local velocity of the fluid in the jet shear layer as close to the nozzle exit as possible and through creation of vortices in the exit flow having high pressure reductions or vapor cavities at their center. In this embodiment, the fluid jet is submerged, so that it is caused to flow through a relatively stationary body of liquid, such as spent fluid from the jets, and vortices are thereby created in a second shear zone between the exiting fluid jet and the surrounding (relatively quiescent) liquid. Low pressures are created in the center of the vortices, which promote the growth and collapse of the vapor cavities, further enhancing the decontamination by cavitation.

BRIEF SUMMARY OF THE INVENTION

The present invention utilizes jet-induced cavitation to efficiently reduce or eliminate contaminants in large volumes of liquid. Very intense jet-induced cavitation occurs in one or more shear zones associated with the jet nozzle, triggering oxidation and reduction reactions which result in decomposition of contaminating compounds, and also triggering the physical destruction and decomposition of microorganisms and larvae, efficiently and effectively remediating polluted waters or other liquids. As used herein, the term "liquid" is used to indicate any aqueous or non-aqueous liquid or solution comprising one or more contaminants susceptible to destruction or decomposition by the occurrence of jet-induced cavitation events.

It is an object of this invention to provide a method and apparatus for the remediation of liquids by the generation of aggressive fluid jet cavitation by passage of the liquid through a first shear zone in the interior of the jet nozzles. It is a closely related object to employ a multiplicity of such nozzles in a decontamination system utilizing this invention.

It is a further object to provide an enhanced remediation method and apparatus by submerging the fluid jets to create vortical structures in a second shear zone between the high velocity liquid exiting the jet nozzle and the relatively stationary liquid into which the jet is released.

It is a closely related object to maximize the remediation capability of this invention by providing a multiplicity of submerged jets, preferably in a configuration and under flow conditions suitable for the generation of vortex ring cavitation, that is, the generation of vortices in a second shear zone by transformation of the initially spherical bubble nuclei into rotating ring-shaped shear-flow bubbles, further enhancing the cavitation effects.

A further object is to provide a method and apparatus for decontamination of polluted liquids in which the dynamics of the jet-induced cavitation are optimized for particular contaminants through control of the temperature, pH, ambient pressure, cavitation number, air and other gas content, and/or cavity surface area.

An additional advantage of this invention is that it provides an effective decontamination method that is relatively simple to scale up and adapt to a wide range of industrial and municipal applications, with the related ability to process large quantities of liquids while operating at low to moderate ambient pressures, for modest power consumption.

It is a related object to utilize the dual cavitational effects of the jet nozzle to cause the physical destruction of microorganisms or larvae by disruption of their cell walls or outer membranes and also to cause the chemical oxidation or reduction of organic and some inorganic contaminants, including the cellular components of destroyed microorganisms or larvae.

In an alternative embodiment of the invention, it is intended to provide a remediation method and apparatus in which the cavities are made to collapse more strongly by providing a solid surface in close proximity to the jet flow exiting the nozzle. The presence of the solid surface creates an area of stagnation, promoting asymmetric cavity collapse with the formation of high speed microjets traveling through the collapsing bubbles, intensifying bubble collapse.

In still another alternative embodiment of the invention, it is intended to provide a method and apparatus which comprises a means of acoustically exciting the jet shear layer by proper selection of the geometry and shape of the nozzle assembly so as to structure into large vortical motions which cavitate.

Other objects and advantages will become apparent from a consideration of the ensuing description, claims, and accompanying drawings.

BRIEF DESCRIPTION OF THE DRAWINGS

The accompanying drawings, which are incorporated in and constitute a part of the specification, illustrate preferred embodiments of the invention and, together with the general description given above and the detailed description of the preferred embodiments given below, serve to explain the principles of the invention.

FIG. 1—1 is a cutaway side view of a jet-forming nozzle useful in the present invention, illustrating the fluid jet flow through a single jet nozzle, with high intensity cavity formation in a first shear zone.

FIG. 1–2 is a cutaway side view of a jet-forming nozzle useful in the present invention, in employing a submerged fluid jet embodiment, illustrating a second shear zone, in which vortex (ring-shaped) cavity formation is caused by the jet flow exiting the jet nozzle into a relatively stationary volume of liquid.

DETAILED DESCRIPTION OF THE INVENTION

The detailed elements and specific embodiments of the present decontamination system can be best appreciated by further understanding the cavitation phenomenon employed to drive the physical and chemical decontamination reactions. Due to large fluctuating pressure forces in the shear layer zones of cavitating and structured turbulent jets, initially-microscopic bubbles grow in the regions of pressure drop and collapse in the regions of pressure rise. When subjected to cavitation, various molecules in the liquid undergo dissociation and form free radicals which are powerful oxidizing or reducing agents. For example, in aqueous liquids it is believed that the dissociation of water to form hydroxyl radicals occurs under intense cavitation due to the growth and collapse of microscopic bubbles. Analogous dissociation of other molecules may occur as a result of cavitation in aqueous solutions as well as in non-aqueous liquids and solutions, producing radicals which similarly aid in the decontamination reactions described herein. Moreover, cavitation generated in any liquid environment will result in the physical disruption of contaminants, without regard to the generation of particular radicals. The methods and systems of this invention will be applicable for all liquid environments comprising contaminants susceptible to decomposition or destruction via the physical and/or chemical effects of the jet cavitation employed.

Jet cavitation refers to the formation and growth of vapor-filled cavities in a high velocity flowing stream of liquid issuing from a suitable nozzle, where the local pressure surrounding the gas nuclei in the liquid is reduced below the pressure necessary for the nuclei to become unstable, grow and rapidly form large vapor-filled cavities or bubbles. This critical pressure is equal to or less than the vapor pressure of the liquid. These vapor-filled cavities are convected along with the jet stream issuing from the nozzle and when the local pressure surrounding the cavities rises sufficiently above the vapor pressure of the liquid, the cavities collapse and chemical reactions occur in the vicinity of the collapse.

There are several theories for the cause of the chemical reactions that take place upon the bubble collapse. According to one, the generation of a "hot spot" upon bubble collapse (local high temperature and pressure region) is responsible for the enhanced reactions. According to this theory, the collapse of the myriad of bubbles in the cavitated region creates a multitude of localized high temperature and high-pressure spots (up to 5,000° C. and 1,000 atmospheres) that achieve the oxidation (and/or reduction) and thus the desired remediation effects. Other theories of cavitation suggest that the reactions are generated by shock waves or electric discharges generated at the bubble collapse, or to the formation of a plasma-like state in the collapsing bubble. Regardless of causation, the physical and chemical reactions that take place at the site of the cavitation event are efficiently utilized in the process of the present invention for the elimination of organic and other contaminants from the liquids.

The characteristics and behavior of the generated cavities strongly affect oxidation efficiency. Due to control of the jet shear flow, aggressive cavitation can be generated at moderate jet pressures with no need to reduce the ambient pressure (for purposes of this invention, "ambient pressure" refers to the pressure of the liquid into which the fluid jet issues). In operation at low to moderate ambient pressures (i.e., about 0 to 100 psi), the fluid jet cavitation used in this remediation method nevertheless generates high volumes of small cavities or cavities whose morphology exhibits a large surface area to volume ratio (e.g., rings, threads, helical patterns, etc.).

It is expected that the cavitational decontamination process of this invention will be operable over a very wide range of pressures. Thus, the system can be utilized in decontaminating the liquids in situ, without the need for removing them or for increasing or reducing the pressure (for example, in industrial processes operating at increased pressures, or in decontaminating polluted waters at depths which result in increased pressures). Nevertheless, from a purely economic standpoint, it would be advantageous to operate at low to moderate ambient pressures for attaining high levels of decontamination while realizing the economies of these lower pressures.

Jet-induced cavitation occurs in the jet shear layers primarily at the cores of vortex lines and rings present in the jet flow. Thus, the jet flow nozzles described here are particularly suitable for use in liquid remediation systems since they generate very intense cavitation-induced oxidation (or reduction) reactions over a large volume of liquid. The use of submerged jet nozzles is preferred, in which the fluid jets into a volume of relatively static liquid, forming vortices in the shear layer in a second shear zone, thereby further increasing the overall cavity surface area.

The surface area of the cavities generated and the surface area-to-volume ratio are key parameters affecting the efficiency of the process, with larger surface areas and surface area-to-volume ratio resulting in higher decontamination efficiencies. This can be explained by the need to bring molecules of the contaminants to be oxidized (or reduced) into close proximity with the hydroxyl or other radicals, or high pressure and temperature regions, generated by the collapsing cavities. Increasing the overall bubble surface area in contact with the contaminated liquid, increases the probability of the hydroxyl or other radicals and contaminants being close enough to react.

The creation of shear in the area of cavitation significantly improves the efficiency of the cavitation reactions by promoting more intense cavitation events. The ability of the jet nozzles to generate cavitation in many jet vortex lines and rings and the use of multiple, submerged jet nozzles can be employed to induce very large total cavity surface area-to-volume ratios. Thus, the invention teaches how to employ liquid jet flows to generate widespread and intense cavitation events, producing hydroxyl or other radicals that rapidly oxidize organic compounds and ultimately break them down into simple nontoxic compounds, such as carbon dioxide and hydrogen. This results in a very high efficiency cavitation-based decontamination system.

Turning now to the drawings, one can appreciate how the present invention achieves increased decomposition of contaminants by maximizing the surface area of the cavities generated and also maximizing the volume of liquid which is subjected to cavitation.

Combined with the ability to operate at a greatly reduced velocities and thus flow rates as compared to prior art methods, the present invention offers a simple and economic system for decontamination of polluted waters.

Figure 11:
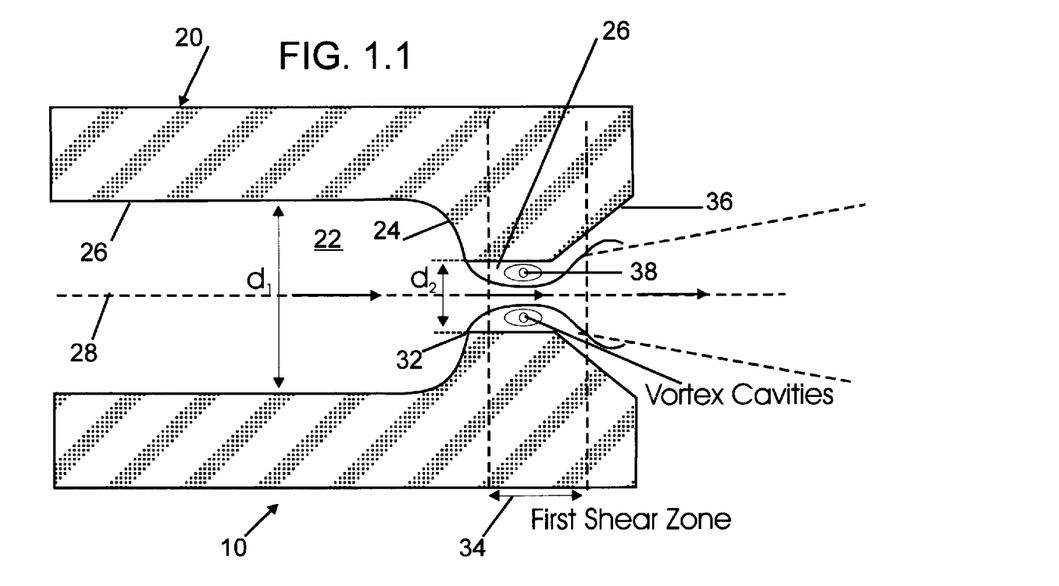

FIG. 1 illustrates the formation of an internal shear layer within the nozzle (in first shear zone 34), and the interaction between the jet shear layer and interior nozzle surface 26 which interaction actively enhances the cavitation effect by causing vortical cavities or structures 38 to become more structured. In FIG. 1—1, jet forming nozzle 10 comprises nozzle body 20, which includes an internal chamber 22 for receiving liquid to be treated and has a longitudinal centerline axis 28 therethrough. Interior chamber 22 has an interior chamber surface 24 (diameter=$d_1$) that tapers sharply as shown to a restricted opening or orifice 32 (diameter=$d_2$) at the downstream end of interior chamber 22. As a result of the sharp tapering of interior chamber surface 24, there is a rapid change in the direction of fluid flow, from flow along the interior chamber surface 24, to flow toward centerline axis 28. This change in flow direction creates a generally conically shaped shear layer between the fluid jetting toward centerline axis 28 and the relatively static liquid trapped in the space adjacent to interior nozzle surface 26. The effect of such shear results in a very rapid pressure drop, thereby resulting in very aggressive cavitation events. Thus, the sharp tapering of interior chamber surface 24 should be sufficient to create the described shear layer. The tapering of interior chamber surface 24 preferably is arcuate, but may be flat or of another sharply tapering design. For example, in one embodiment, the downstream end of interior chamber 22 may be a flat plate with orifice 32 being an opening machined therein.

The sharp tapering of interior chamber surface 24 rapidly raises the velocity of the fluid jet, preferably very close to restricted orifice or nozzle entry port 32 in order to minimize shear layer thickness and vortex core size and thus maximize pressure reduction in first shear zone 34. In turn, this maximizes the formation of vapor cavities or bubbles 38, increasing the efficiency of the decontamination system.

Additional interaction with interior nozzle surface 26 can facilitate the formation of large vortical structures. In a preferred embodiment, interior nozzle surface 26 is of sufficient length to permit and encourage such interaction and structured cavitation, while being sufficiently short to allow passage of vapor cavities or bubbles 38 through exit port 36.

Figure 12:
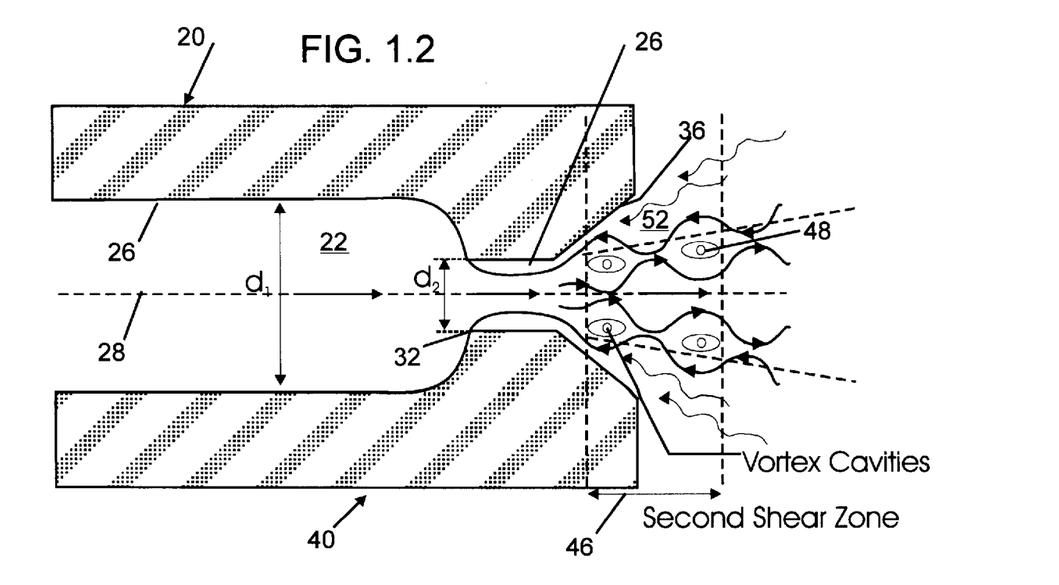

FIG. 1–2 illustrates a preferred embodiment of the invention, in which exit port 36 of nozzle 40 is submerged in a volume of fluid in chamber 52 so that the fluid is jetted into chamber 52, forming second shear zone 46, in which the shear between the moving jet and stationary liquid produces ring-shaped vortices about the circumference of the fluid jet, perpendicular to the direction of flow of the jet. These vortices cause the development of rotating ring-shaped vortex cavities or structures 48 in second shear zone 46. Some additional linear vortices are also generated along the jet periphery. The vortex cavitation of the present invention generates very large cavity surface areas available for the cavitation-induced reactions thereby maximizing the decontamination reactions and providing a decontamination technique with significantly advanced efficiency.

Figure 4:
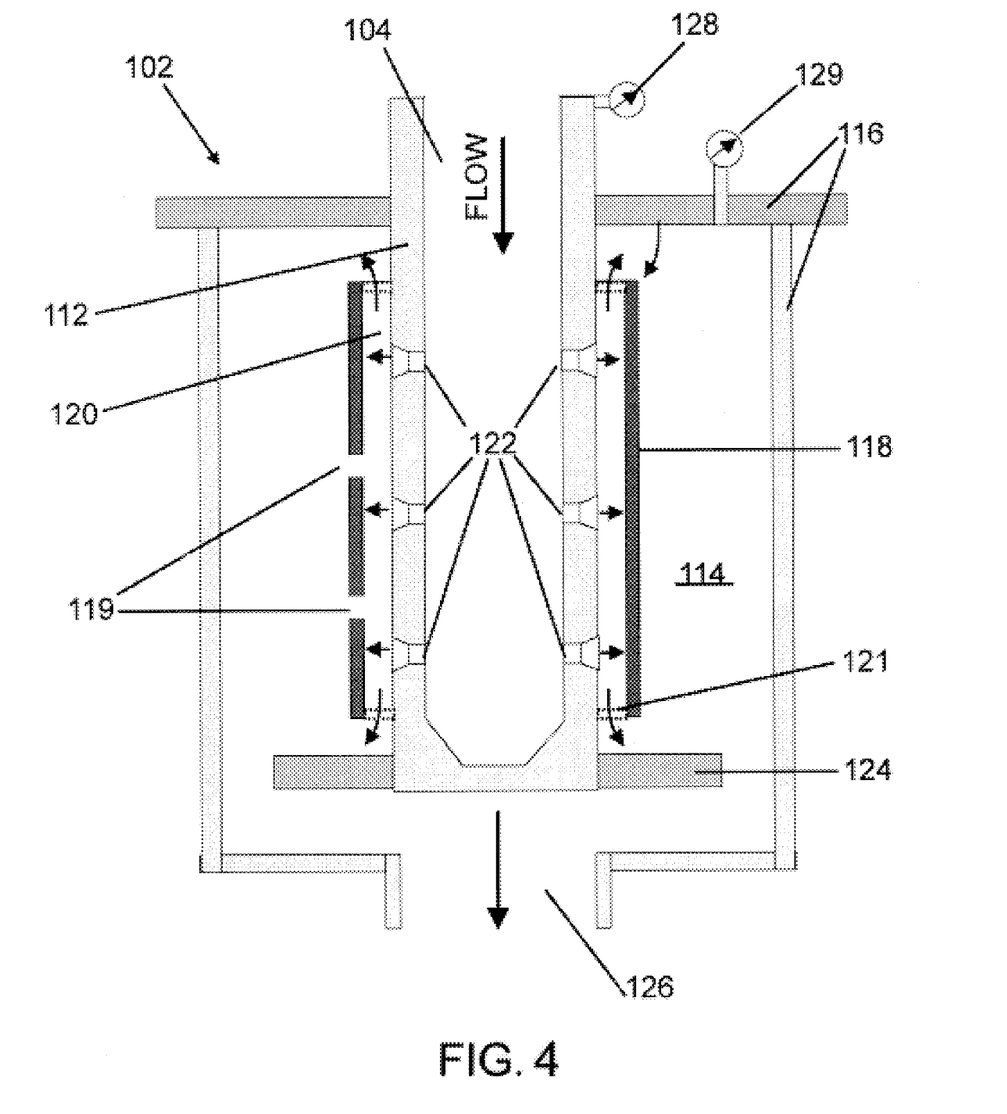
FIG. 4 is a cutaway side view of a further embodiment of the decontamination system having a multiplicity of submerged cavitating jets in which the cavitating jet flows are impacted onto a solid surface.

It will be appreciated that it will be preferred to design the jet nozzle so that the cavitation generated in first shear zone 34 is sufficiently close to exit port 36 that a high proportion of the cavities generated pass through exit port 36 prior to collapsing. In embodiments of the invention utilizing submerged nozzles, such design causes those cavities to be subjected to further intensification in second shear zone 46. In a preferred embodiment, the configuration of exit port 36 is flared (as shown in FIG. 1—1) to enhance vortical motion. In a further alternative embodiment, a plate or surface may be arranged in second shear zone 46 (such as shown in FIG. 4) to further increase the intensity of the cavitation bubble collapse.

Various flow conditions and nozzle and orifice geometries and designs can be used to induce the explosive growth of microscopic cavities or bubbles within the liquid jet utilized here. Jet nozzles of the types previously used for mechanically eroding, cutting or cleaning purposes have now been found to be well suited for generating the intense cavitation utilized in the methods and systems of the present invention to achieve decontamination of various liquids. For example, the cavitating fluid jet nozzles described in U.S. Pat. No. 3,528,704 (Johnson, Jr.), U.S. Pat. No. 3,713,699 (Johnson, Jr.), U.S. Pat. No. 4,262,757 (Johnson et al.), U.S. Pat. No. 4,389,071 (Johnson et al.), U.S. Pat. No. 4,474,251 (Johnson, Jr.), U.S. Pat. No. 4,508,577 (Conn et al.) and U.S. Pat. No. 4,681,264 (Johnson, Jr.) would be suitable for use in this invention.

Passive acoustic excitation of the jet flow optionally may be employed to induce the formation of large vortical ring cavities in second shear zone 46. Passive acoustic excitation or resonance may be achieved by matching the turbulent jet natural frequency with that of the jet nozzle to optimize the formation of organized vortical ring structures 48. Methods and apparatus for enhancing are described in U.S. Pat. Nos. 4,389,071 and 4,474,251. These patents describe methods and apparatuses for oscillating the velocity of the liquid jet at a preferred Strouhal number within the range of about 0.2 to about 1.2. Such oscillation of the liquid jet is described as advantageously inducing a series of discrete vortices wherein cavitation occurs.

Figure 5:
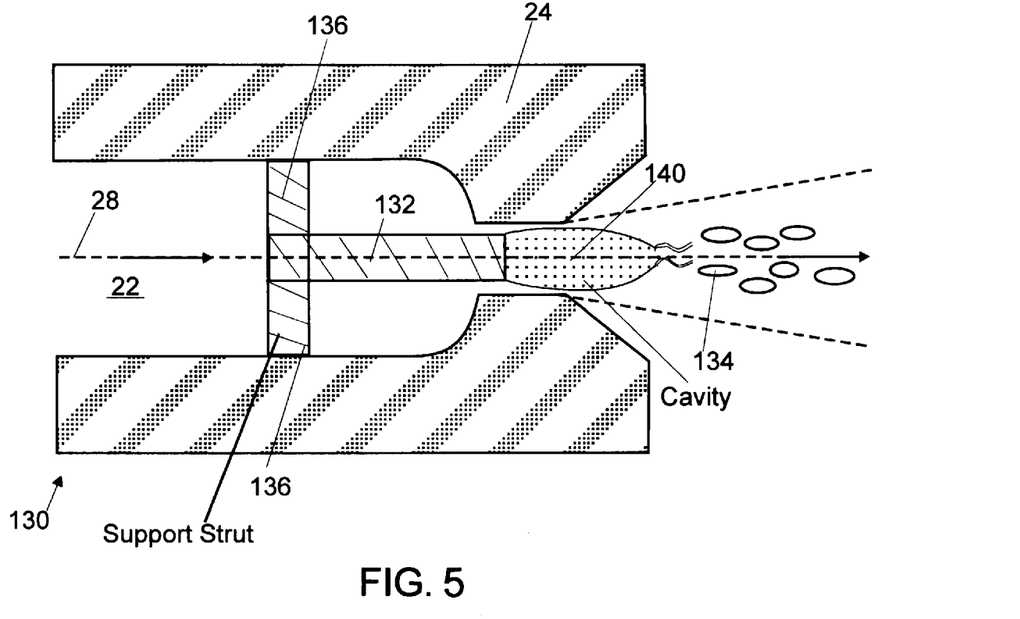
FIG. 5 is a cutaway side view of another embodiment of the present invention in which the jet orifice includes a cylindrical bluff center-body along its axis.

Other nozzle designs and configurations for generating and enhancing fluid jet flows can be utilized as well. For example, the flow through the nozzle may be pulsed, such as the self-resonating pulsed fluid jet nozzles described in U.S. Pat. No. 4,474,251. It may be desirable to incorporate the use of center-bodies (i.e., cylinders, disks, or the like) as taught in U.S. Pat. No. 3,528,704 (Johnson, Jr.); a nozzle of this general type is shown in FIG. 5, described below.

For maximum efficiency in decomposing the contaminants, it will be preferred to utilize a system configured to generate both first shear zone 34 and second shear zone 46, in order to achieve aggressive cavitation. However, it will be appreciated that jet cavitation-induced decontamination also can be conducted in configurations employing either one or the other shear zone. For example, interior chamber surface 24 may have a gradually tapering geometry (or may comprise a flat plate with one or more orifices provided therein), provided that nozzle exit port or orifice 36 is submerged as shown in FIG. 1—1, and provided that the system provides for sufficient pressure drop between interior chamber 22 and stationary fluid chamber 52. Use of an impact plate or surface (cylindrical wall or sleeve 118 as shown in FIG. 4) would enhance the efficiency of such a system. Alternatively, sufficient cavitation can be generated by a system as in FIG. 1—1 (that is, without the nozzle being submerged), utilizing the nozzle design and flow conditions to optimize cavitation. In a non-submerged system, it will be advantageous to employ a nozzle center-body (as shown in FIG. 5). A batch process embodiment of the present invention is shown generally in FIG. 2. Circulating flow loop 70 comprises cavitation reaction chamber 74 in which the circulating fluid is caused to flow through jet nozzle 76. The circulating fluid is driven by main liquid pump 78. Circulating flow loop 70 includes pH sensing means 82 for measuring the pH of the circulating fluid, and also includes pH control means 84 for adjusting the pH of the liquid (for example, by injection of concentrated acid or base solutions into the circulating fluid). Circulating flow loop 70 also contains temperature sensor means 86 for measuring the temperature of the liquid. The desired temperature of the liquid can be maintained by passage through heat exchanger 88. Alternatively, separate chillers and/or heaters, or other convenient temperature control means, may be employed as convenient. Contaminated liquid can be circulated through circulating flow loop 70 for a predetermined treatment cycle, or until the contaminants have been reduced to target levels. Sampling port 89 permits assays of the treated fluid to determine the duration of the treatment cycle.

Figure 3:
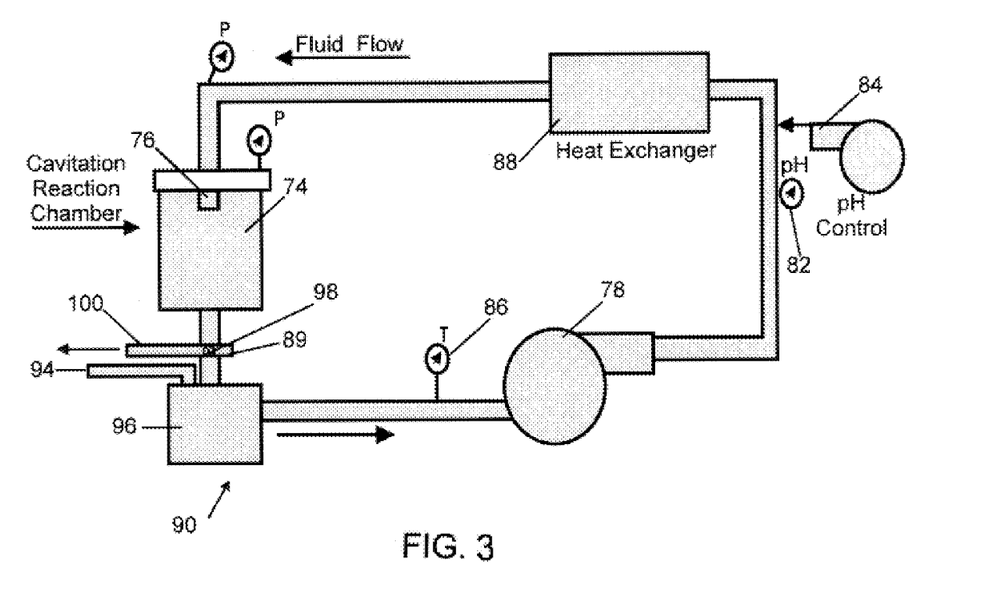
FIG. 3 is a schematic flow diagram of another embodiment of the decontamination system of this invention operating in a continuous flow mode.

The present invention is well suited to operation in a continuous decontamination system, one embodiment of which is shown in FIG. 3. Decontamination system 90 includes feed reservoir 96 for receiving the flow of contaminated liquid through feed pipe 94, as well as optionally receiving partially treated liquid from cavitation reaction chamber 74 via recycle valve 98. Sampling port 89 permits assays of the treated fluid in order to adjust the amount of the recycle flow. Adjustment of the amount of the recycle flow determines the mean residence time of the fluid in cavitation reaction chamber 74. Recycle valve 98 enables treated liquid exiting cavitation reaction chamber 74 to be recycled into feed reservoir 96 for further treatment or to be removed from decontamination system 90 via outflow pipe 100.

FIG. 4 shows an embodiment of this invention in one configuration employing a multiplicity of jet flow nozzles 122 for treating contaminated liquid. The liquid enters cavitation chamber 102 via chamber entry port 104 to manifold 110, which is defined by manifold wall 112. Manifold wall 112 has a multiplicity of nozzles 122 machined or inserted therein. Manifold 110 is disposed within outer chamber 114, which is defined by outer chamber walls 116. Pressure gage 128 permits monitoring the pressure of the fluid entering cavitation chamber 102 and pressure gage 129 permits monitoring the ambient pressure of the fluid within outer chamber 114. The relative pressures may be adjusted to optimize the cavitation. For example, when operating at approximately atmospheric ambient pressures, it is preferred that the liquid in manifold 110 be pressurized to at least about 60 psi above the pressure of the liquid in outer chamber 114; at higher ambient pressures, the preferred pressure differential will be greater. It will be within the skill of the operator to adjust the system to achieve optimal cavitation. As fluid is jetted through nozzles 122, and into outer chamber 114, cavitation is induced and the contaminants are decomposed.

FIG. 4 also depicts optional, but preferred, cylindrical wall or sleeve 118, which is disposed about manifold 110, for example, via struts 121, a short distance from nozzles 122, preferably a few nozzle diameters, defining annular gap 120. The fluid jets exiting nozzles 122 stagnate within annular gap 120, increasing ambient pressure in that region. The changing pressure initiates the asymmetric collapse of the cavitation bubble. One portion of the bubble wall begins to dimple, and the pressure differences create a microjet, or reentrant jet, which accelerates collapse of the bubble. The microjet travels through and impinges on the opposite wall of the collapsing bubble, resulting in more vigorous collapse of the cavities associated with the jets.

It will be appreciated that the geometry of cylindrical wall 118 is not critical to the invention and that it may be substituted with plates or walls of other geometry, provided that an impact surface is in sufficient proximity to the jet nozzles to enhance the cavitation as described above. Cylindrical wall 118 may contain orifices 119 to control the pressure in annular gap 120 between nozzles 122 and cylindrical wall 118. Diverter plate 124 extends from the bottom of manifold 110 to shield the exit port 126 from the flow from annular gap 120, provide additional stagnation of the flow and enhance mixing in outer chamber 114. The treated liquid exits cavitation chamber 102 via chamber exit port 126 in outer chamber wall 116. A decontamination system of the present invention may utilize a configuration based on that of FIG. 4, with multiple manifolds, each having multiple jet nozzles.

In addition to utilizing a multiplicity of jet nozzles in a single cavitation chamber, such as depicted in FIG. 4, it is also within the present invention to employ sequential jet cavitation chambers. For example, a decontamination system of this invention may employ a series of stages or chambers through which the flow sequentially progresses through one or more cavitating jet orifices, and in which the ambient pressures in the various chambers are controlled and decrease in the direction of flow such that a desired set of cavitation numbers is achieved. A multiplicity of jet nozzles may be arranged in each chamber. Stagnation plates or surfaces may be included in one or more of the chambers.

FIG. 5 illustrates jet nozzle 130 comprising center-body 132, an embodiment which will be preferred in many applications of the present decontamination invention. Referring to FIG. 5, large cavity 140 and additional smaller cavities 134 may be generated in the fluid jet flow by placement of center-body 132 roughly along centerline axis 28, supported within interior chamber 22 by support struts 136 (or by other convenient means). In this embodiment, an additional shear layer is generated in the wake of center-body 132, leading to the generation of additional bubbles or cavities 134 in the vortices of the wake. FIG. 5 illustrates the use of a cylindrical bluff center-body. The size, shape and position of center-body 132 may be adjusted to control the characteristics and intensity of the cavitation generated as well as the flow rate through jet nozzle 130. Center-body 132 may be positioned within nozzle 130 by any convenient means, such as by support struts 136. Examples of the use of center-bodies are illustrated in U.S. Pat. No. 3,528,704 (Johnson, Jr.) which discloses the use of center-bodies (i.e., cylinders, disks, or the like), and in U.S. Pat. No. 5,086,974 (Henshaw) which describes a cavitating jet nozzle for cleaning surfaces, including a free-floating pin received at a central position which lowers the pressure such that cavitation bubbles form in the liquid.

The physical and chemical cavitation reactions employed in this invention will be effective for removing or reducing a variety of contaminants from aqueous and non-aqueous liquids. Frequently, all the contaminating compounds will not have been identified in the liquid needing treatment. However, the aggressive cavitation-induced oxidation generated in the manner described here is expected to be useful for causing oxidation of most organic compounds, and oxidation or reduction of some inorganic compounds as well. Oxidation of organic contaminants is a particularly attractive treatment since the contaminants are readily oxidized to carbon dioxide, water and other harmless compounds.

A wide variety of liquids and water sources may be contaminated with various organic wastes and/or dissolved organic compounds. It is expected that decontamination systems utilizing the jet cavitation of the present invention will be advantageous in remediating such liquids and water sources. In addition to eliminating dissolved contaminants, the present system can also eliminate undesirable microorganisms (including various algae (both unicellular and multicellular), bacteria, fungi, protozoa, and viruses) as well as larvae. Pathogenic microorganisms, including, but not limited to, bacteria such as *E. Coli* and salmonella, both of which cause gastrointestinal illness, are a source of contamination to be eliminated from municipal water supplies, private wells, and other waters. Remediation may be desired to eliminate algae, fungi, protozoa, or viruses in a variety of settings. Solutions containing any of these microorganisms can be subjected to the fluid jet cavitation described herein, resulting in their destruction and decomposition.

Other organisms may be vulnerable to treatment by the present cavitation process when present in their larval form.

For example, Zebra mussels, small, fingernail-sized, freshwater mollusks accidentally introduced to North America, have rapidly spread throughout the Great Lakes, Mississippi River basin and other inland waterways in the United States and Canada. A major nuisance, Zebra mussels have colonized water supply pipes of hydroelectric and nuclear power plants, public water supply plants, and industrial facilities, in many cases dangerously restricting water intake to heat exchangers, cooling systems and the like. Although the adult mussel would not be affected, the larval form is free-swimming and susceptible to destruction by fluid jet cavitation. Thus, it may be promising to treat large volumes of waters where zebra mussels are problematic, to eliminate significant larval populations before they colonize additional surfaces. The method can be similarly applied to larval forms of other pests which may be present in water.

The range of application for the remediation process and systems of this invention is almost limitless. For example, systems and apparatuses incorporating the fluid jet cavitation remediation described herein can be adapted to the full range of municipal and industrial settings, including, but not limited to treatment of navigable waters, sanitary systems and industrial effluent. In addition, smaller systems and units will be suitable for the remediation needs of smaller-scale applications, including, but not limited to, the treatment of private wells and pools, the prevention of disease and system upset in aquaculture and aquarium environments, and the like.

It has been further found that controlling the liquid and cavitation environment can further increase oxidation efficiency. The temperature and pH of the liquid to be treated can be controlled to increase the efficiency of the decontamination. In addition, treating the liquid by entraining or saturating with various gases, preferably prior to cavitation, can be employed to further improve the rate of decontamination. Any convenient means may be employed, including, for example, bubbling the gas through the liquid. Suitable gases include, but are not limited to, ozone, argon, krypton, helium, and oxygen. In general, however, it is believed that optimization by controlling the liquid and cavitation environment will depend on the nature of the liquid and the contaminants.

The remediation of the present invention can also be optimized through control of the cavitation number. Again, this is believed to be linked to the contaminant sought to be decomposed, and will vary among applications of the invention. "Cavitation number" is the ratio of the difference between the local ambient pressure of the liquid into which the fluid jet issues and the liquid vapor pressure to the pressure drop across the nozzle. The cavitation number can be controlled by adjusting the pressure of the various reservoirs or chambers through which the liquid travels, that is, the incoming pressure entering the jet nozzle and/or the ambient pressure of the liquid in which the nozzle exit port is submerged.

The efficient decontamination process of this invention also benefits from the fact that pumps are quite efficient in converting electric (or other) power into hydraulic power, which is really all that is needed to drive the remediation embodiments and systems disclosed here. This technology can be used in a variety of systems for treating polluted water, groundwater, wastewater, industrial process liquids, and drinking water. Fluid jet cavitation remediation can be employed as a simple stand-alone process or as a part of a more complex treatment train. In certain applications, it may be desirable to include optional additional processing steps in the decontamination system. For example, the treated liquid may be further subjected to filtration, ion exchange, ultraviolet radiation, or other chemical or physical means for further purification. The remediation process of this invention may be used in a large-scale fixed treatment site or as a small-scale temporary or portable remediation system.

EXAMPLES

Example 1

This example examines the influence of the number of jet nozzles on the oxidation of reagent grade p-nitrophenol (PNP) (Aldrich, 99%). The PNP was in crystalline form and was mixed with distilled water to an initial concentration of 8 ppm. PNP concentrations were measured using a UV-Vis spectrophotometer by standard procedures. The spectrophotometer was calibrated against known concentrations of PNP in distilled water at a wavelength of 400 nm after shifting the sample pH to 11 by the addition of NaOH to enable measurement employing the absorption band at 400 nm. During testing, 3 ml samples were drawn from the test reservoir after 2 hours for measurement of PNP concentration. Oxidation efficiency is reported as the amount of PNP removed (in milligrams) per unit input energy (in megajoules). The unit input energy is the product of pressure, flow rate and time.

Figure 2:
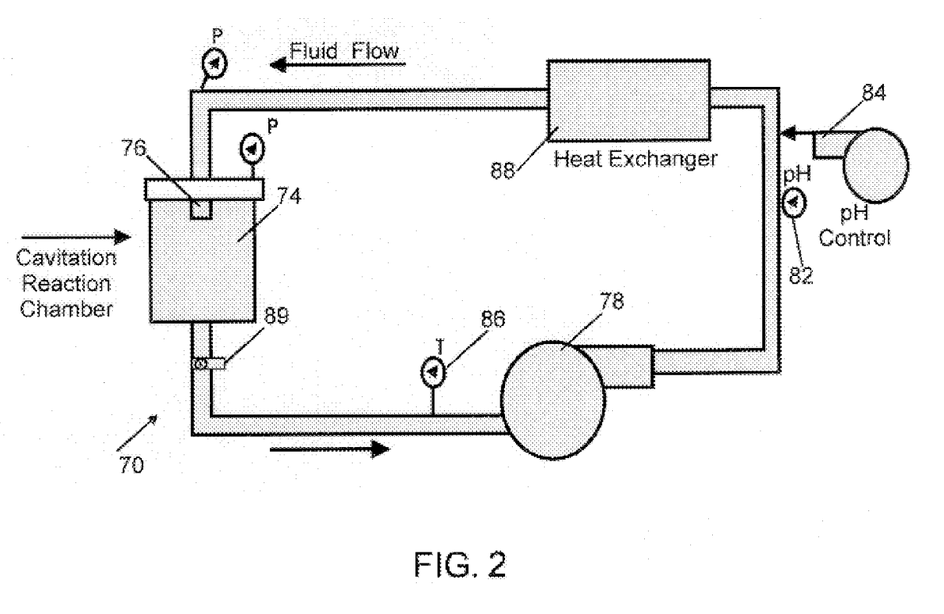
FIG. 2 is a schematic flow diagram of one embodiment of the decontamination system of this invention operating in a batch process mode.

A stainless steel jet cavitation reactor of the configuration illustrated in FIG. 2 was utilized, except that pH was manually controlled in this experiment and temperature was controlled by placing the cavitation chamber in a waterbath (rather than using a heat exchanger). The cavitation reaction chamber comprised a single manifold, generally of the configuration illustrated in FIG. 4, with the specified number of jet nozzles. Experiments were conducted in which the number of jet nozzles (12, 36, 72 or 216) and the nozzle size were varied inversely. The total flow area (and thus the pressure drop and flow rate) for the 12, 36 and 72 nozzle cases were the same, the flow rate being 46 gpm. For the 216 nozzle case, the area and flow rate were increased 25%, the flow rate being 57 gpm. The test solution was maintained at pH=3.8, temperature=107 deg.F. (42 deg.C.). The local ambient pressure of the liquid reservoir outside the manifold was 20 psia. The pressure entering the nozzles was 75 psia. Results after 2 hours are reported in Table I.

TABLE I

| | Oxidation Efficiency | |
| --- | --- | --- |
| Number of Nozzles | | % PNP Removed in 2 hours |
| 12 | 1.03 mg/MJ | 37% |
| 36 | 1.30 mg/MJ | 26% |
| 72 | 2.84 mg/MJ | 57% |
| 216 | 3.45 mg/MJ | 64% |

As can be seen, the oxidation efficiency increases with the number of nozzles (and thus with decreasing nozzle size), with the peak rate approximately doubling between the 12 and 72 nozzle cases. In order to most efficiently process a large volume of liquid, It therefore appears that by maximizing the amount and distribution of cavitation in the liquid (i.e., the percentage of the flowing liquid that is cavitated), the decontamination efficiency will be increased. A very important factor appears to be the ratio of the surface area of the cavities created to the volume of liquid treated. In essence, one seeks to have a large number of small cavities.

Example 2

This example examines the influence of operating at varying pH conditions, from 2.5 to 9.0. The initial PNP concentration of the test solution was approximately 8 ppm. The test solution was maintained at 107 deg.F. (42 deg.C.). The local ambient pressure of the liquid reservoir outside the manifold was 20 psia. The pressure entering the nozzles was 75 psia. The pH of the PNP-containing solution was adjusted by the addition of phosphoric acid or sodium hydroxide. The pressure loop of Example 1 was used here, in the 216 nozzle configuration. The progress of the oxidation process was measured at 2 hours for each pH. Oxidation efficiency is as described in Example 1. Results after 2 hours are reported in Table II.

TABLE II

Oxidation Efficiency

| Number of Nozzles | | % PNP Removed in two hours |
|---|---|---|
| 2.5 | 5.10 mg/MJ | 94% |
| 3.8 | 4.30 mg/MJ | 80% |
| 4.5 | 0.46 mg/MJ | 9% |
| 5.0 | 0.33 mg/MJ | 6% |
| 6.0 | 0.39 mg/MJ | 8% |
| 9.0 | 0.00 mg/MJ | 0% |

The oxidation efficiencies are shown here to strongly depend on pH in a nonlinear fashion, with little influence for pH above about 4. As the pH decreases below 4, the rate is found to increase. Although the results indicate an optimum pH range for this example, the range likely will vary with the nature of the contaminants in the liquid to be treated, as well as with other conditions.

Example 3

A comparative experiment was run, measuring the oxidative efficiency of the jet cavitation of this invention and ultrasonic cavitation induced by means of an ultrasonic horn. The data generated for the 216 nozzle configuration in Example 1 were used. For comparison, an experiment was conducted with a magnetostrictive ultrasonic horn under the same conditions. For the ultrasonic experiment, the local ambient pressure was 14.7 psia. Both experiments were conducted at 107 deg.F. (42 deg.C.). Measurements were taken at 4 hours. Oxidation was measured as described in Example 1. Results are reported in Table IV.

TABLE IV

| Experiment | Oxidation Efficiency | % PNP Removed after 4 hours |
|---|---|---|
| Jet Nozzles (107° F.) | 2.30 mg/MJ | 94% |
| Ultrasonic (107° F.) | 0.05 mg/MJ | 4% |

The results of this experiment show that the use of the jet cavitation of this invention can result in an increase in energy efficiency of as much as two orders of magnitude over ultrasonic cavitation of the same PNP solution.

Although specific embodiments of the invention are described here, it should be understood that such embodiments are by way of example only and illustrate only a small number of possible specific embodiments that represent applications of the principles of the invention. Various changes, configurations, modifications and alterations of the teachings of the present invention may be contemplated by those skilled in the art without departing from the intended spirit and scope of the present invention. As such, it is intended that the present invention only be limited by the terms of the appended claims.

What is claimed is:

1. A method for remediating contaminated liquid comprising the steps of passing at least a portion of said contaminated liquid through one or more jet nozzles to induce fluid jet cavitation in said liquid, wherein said fluid jet cavitation is sufficiently intense to cause decomposition or destruction of contaminants in said liquid, each of the one or more jet nozzles having an entry portion, a central portion, an interior surface and a longitudinal centerline therethrough, said entry portion characterized by an interior surface which tapers sharply to a restricted opening in order to cause a rapid change in direction of the flow of contaminated liquid toward the longitudinal centerline of the nozzle thereby forming a first shear zone within said central portion between the fluid jetting toward the longitudinal centerline and relatively static fluid adjacent the interior surface of said central portion.

2. The method of claim 1 in which said decomposition or destruction is the result of oxidation, reduction, heating or mechanical rupture, or combinations thereof.

3. The method of claim 1 in which said jet nozzles have a central portion of constant inner diameter and an exit portion of expanding inner diameter, said exit portion being of sufficiently short length that cavitation bubble collapse occurs downstream of the nozzle exit.

4. The method of claim 1 which further comprises passive acoustic excitation of the liquid flowing through said jet nozzles.

5. The method of claim 1 wherein said jet nozzles comprise exit ports, which exit ports are submerged in a volume of liquid.

6. The method of claim 5 wherein liquid jetting from said submerged exit ports into said volume of liquid induces vortical cavities or structures to form.

7. The method of claim 1 in which said liquid is water or an aqueous solution.

8. The method of claim 1 in which the contaminants in said contaminated liquid are selected from the group consisting of organic compounds, oxidizable inorganic compounds, reducible inorganic compounds, microorganisms and larvae.

9. The method of claim 1 which further comprises the steps of determining the contaminants in said contaminated liquid and controlling the pH of said contaminated liquid to optimize said fluid jet cavitation and the decomposition or destruction of said contaminants.

10. The method of claim 1 which further comprises the steps of determining the contaminants in said contaminated liquid and controlling the temperature of said contaminated liquid to optimize said fluid jet cavitation and the decomposition or destruction of said contaminants.

11. The method of claim 1 which further comprises the step of treating said liquid by ion exchange, adding rare gases to said liquid, treating said liquid by ultraviolet radiation, or recycling at least a portion of said liquid through said nozzles.

12. The method of claim 1 in which the exit port of each of said jet nozzles is submerged in a liquid such that the fluid jet emerging from said nozzle creates a second shear zone sufficient to induce the formation of vortex cavitation.

13. The method of claim 12 in which said contaminated liquid is passed through a series of chambers, each such chamber comprising one or more of said jet nozzles.

14. The method of claim 13 which comprises the step of controlling the ambient pressure in each of said chambers, such that the ambient pressures decrease in the direction of flow to achieve a desired set of cavitation numbers.

15. An apparatus for the remediation of contaminated liquids by the induction of jet cavitation in said liquid comprising:

a pump connected to a source of contaminated liquid, means for communicating with the pump with an entry chamber for receiving a flow of contaminated liquid, and one or more jet nozzles wherein each of the one or more jet nozzles, having an entry portion, a central portion, an interior surface, a longitudinal centerline therethrough, and a exit port, said entry portion characterized by an interior surface which tapers sharply to a restricted opening in order to cause a rapid change in direction of the flow of contaminated liquid toward the longitudinal centerline of the nozzle thereby forming a first shear zone shear within said central portion between the fluid jetting toward the longitudinal centerline and relatively static fluid adjacent the interior surface of said central portion, and each nozzle is arrayed in said entry chamber in a manner which allows said contaminated liquid to flow from said entry chamber into the entry portion of the nozzle and to exit the exit port of the nozzle, inducing jet cavitation in said liquid wherein said jet cavitation is sufficiently intense to cause decomposition or destruction of contaminants in said liquid.

16. The apparatus of claim 15 wherein each of said jet nozzles comprises a constant inner diameter downstream of the entry portion of said nozzle.

17. The apparatus of claim 15 wherein each of said jet nozzles further comprises an exit portion of expanding inner diameter, said exit portion being of sufficiently short length that cavitation bubble collapse occurs downstream of the nozzle.

18. The apparatus of claim 15 wherein said jet nozzles are self-resonating pulsed cavitating liquid jet nozzles.

19. The apparatus of claim 15 which further comprises an outer chamber immediately downstream of said jet nozzles, said outer chamber containing a volume of liquid sufficient to submerge the exit ports of said nozzles such that the fluid jet emerging from said nozzle creates a second shear zone sufficient to induce the formation of vortex cavitation.

20. The apparatus of claim 19 which further comprises an impact surface downstream of and in sufficiently close proximity to said exit ports to cause the cavitation bubbles in the fluid jets exiting said ports to collapse between said exit ports and said surface.

21. The apparatus of claim 15 which further comprises a recycle valve and loop to allow the optional recycle of all or a portion of treated liquid through said jet nozzles.

* * * * *

UNITED STATES PATENT AND TRADEMARK OFFICE
Certificate

Patent No. 6,200,486 B1                                      Patented: May 13, 2001

On petition requesting issuance of a certificate for correction of inventorship pursuant to 35 U.S.C. 256, it has been found that the above identified patent, through error and without deceptive intent, improperly sets forth the inventorship.
   Accordingly, it is hereby certified that the correct inventorship of this patent is: Georges L. Chahine, Silver Spring, MD; Kenneth M. Kalumuck, Columbia, MD; and Richard Gregg, II, Huntsville, Alabama.

Signed and Sealed this Twenty-sixth Day of February 2002.

WANDA L. WALKER
*Supervisory Patent Examiner*
Art Unit 1723